United States Patent [19]
Elings et al.

[11] Patent Number: 5,224,376
[45] Date of Patent: Jul. 6, 1993

[54] ATOMIC FORCE MICROSCOPE

[75] Inventors: Virgil B. Elings; John A. Gurley, both of Santa Barbara; Peter Maivald, Goleta, all of Calif.

[73] Assignee: Digital Instruments, Inc., Santa Barbara, Calif.

[21] Appl. No.: 831,876

[22] Filed: Feb. 6, 1992

Related U.S. Application Data

[63] Continuation of Ser. No. 707,292, May 30, 1991, which is a continuation of Ser. No. 447,851, Dec. 8, 1989, abandoned.

[51] Int. Cl.$^5$ .............................................. G01B 7/34
[52] U.S. Cl. ...................................... 73/105; 364/527
[58] Field of Search ...................... 73/105, 78, 81, 82, 73/83, 85, 104; 250/306, 307; 33/551–555, 556–561; 364/527

[56] References Cited

U.S. PATENT DOCUMENTS

| | | | |
|---|---|---|---|
| 4,343,993 | 8/1982 | Binnig et al. | 250/423 F |
| 4,618,767 | 10/1986 | Smith et al. | 250/306 X |
| 4,724,318 | 2/1988 | Binnig | 250/306 |
| 4,806,755 | 2/1989 | Duerig et al. | 250/306 |
| 4,823,004 | 4/1989 | Kaiser et al. | 250/307 X |
| 4,848,141 | 7/1989 | Oliver et al. | 73/81 |
| 4,889,988 | 12/1989 | Elings et al. | 250/306 |
| 4,935,634 | 6/1990 | Hansma et al. | 250/560 |
| 4,954,704 | 9/1990 | Elings et al. | 250/306 X |
| 5,003,815 | 4/1991 | Martin et al. | 250/305 X |
| 5,051,646 | 9/1991 | Elings et al. | 310/328 X |
| 5,162,653 | 11/1992 | Hosaka et al. | 250/306 |

*Primary Examiner*—Tom Noland
*Attorney, Agent, or Firm*—Oblon, Spivak, McClelland, Maier & Neustadt

[57] ABSTRACT

This invention is an atomic force microscope having a digitally calculated feedback system which can perform force spectroscopy on a sample in order to map out the local stiffness of the sample in addition to providing the topography of the sample. It consists of a three-dimensional piezoelectric scanner, scanning either the sample or a force sensor. The force sensor is a contact type with a tip mounted on a cantilever and a sensor to detect the deflection of the lever at the tip. The signal from the sensor goes to an A-D convertor and is then processed by high-speed digital electronics to control the vertical motion of the sample or sensor. In operation, the digital electronics raise and lower the piezoelectric scanner during the scan to increase and decrease the force of the tip on the sample and to use the sensor signal to indicate the change in height of the tip to measure the which is the spring constant of the sample. This constant can be determined with nanometer spatial resolution. At the same time, the instrument can determine the topography of the sample with nanometer resolution. In an alternate embodiment, the lever is connected to a separate piezoelectric driver to vary the force on the tip. This improved AFM can also be used to periodically reset the force at which the tip contacts the sample and quickly replace the tip on the sample in the event that the tip loses contact with the surface.

11 Claims, 4 Drawing Sheets

FIG. 4
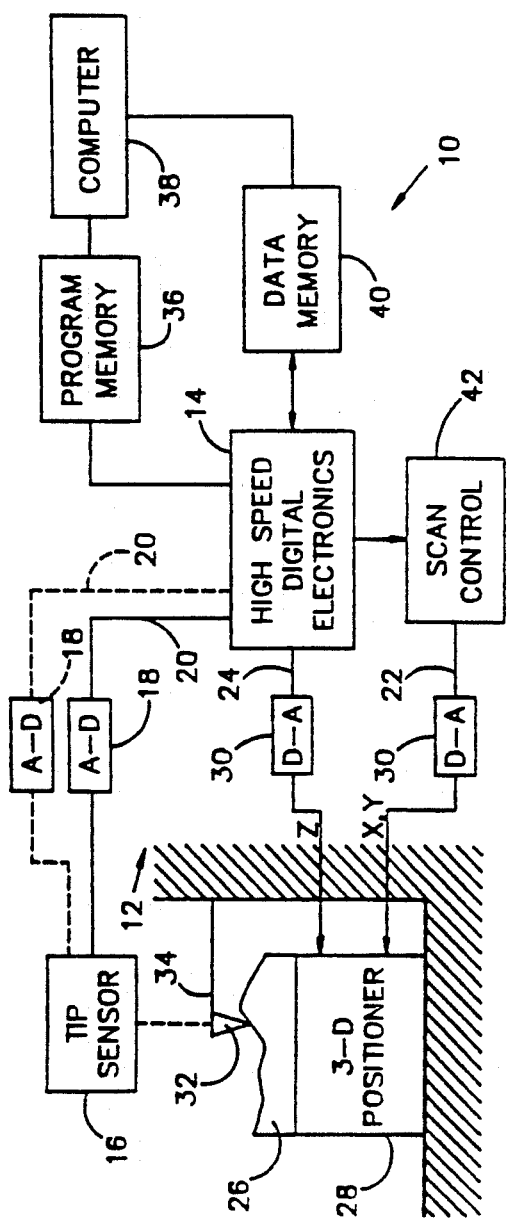
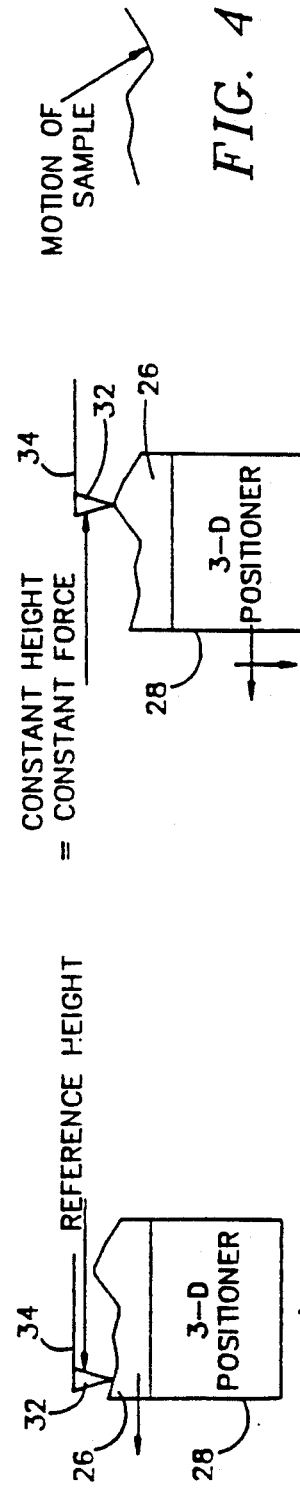

ATOMIC FORCE MICROSCOPE

The present application is a continuation of U.S. patent application Ser. No. 07/707,292 filed May 30, 1991, which is a continuation of abandoned U.S. application Ser. No. 07/447,851 filed Dec. 8, 1989.

BACKGROUND OF THE INVENTION:

This invention relates to atomic force microscopes and, more particularly, in an atomic force microscope having a sample holder and a probe with a sensing tip, scanning means for creating relative movement between a sample in the holder and the sensing tip in orthogonal X, Y, and Z coordinate directions, sensing means for sensing the position of the sensing tip, and feedback means connected between the sensing means and the scanning means for creating a scan of the tip over a sample in the holder and for maintaining the tip in a pre-established relationship with respect to a scanned surface of the sample in the Z direction to obtain height information about the scanned surface of the sample, to the improvement to also allow material characteristics information to be obtained simultaneously about the scanned surface of the sample wherein the feedback means comprises, analog-to-digital conversion means for obtaining an analog signal from the sensing means and for converting the analog signal into a digital signal; digital computation means including program means for receiving the digital signal from the analog-to-digital conversion means and for calculating and outputting first digital vertical control signals which create desired relative movement between a sample in the holder and the sensing tip in the Z coordinate direction which maintain the tip in the pre-established relationship with respect to the scanned surface of the sample in the Z direction; and, first digital-to-analog conversion means for receiving the first digital vertical control signals from the digital computation means and for outputting analog control signals to the scanning means to affect movement thereof in the Z direction.

The atomic force microscope is a device which uses a very sharp tip and low forces to profile the surface of a sample down to atomic dimensions. Such a device, using a tunneling current sensor, is described in U.S. Pat. No. 4,724,318 by Binnig et al. An improved microscope which can operate with the tip in a fluid is described in a co-pending application by Hansma and Drake, Ser. No. 322,001, filed 13 Mar. 1989, now U.S. Pat. No. 4,935,634, and entitled ATOMIC FORCE MICROSCOPE WITH OPTIONAL REPLACEABLE FLUID CELL, which is licensed to the assignee of this application.

Basically, these devices have a tip on a flexible lever with the vertical position of the tip sensed by a detector. These detectors vary and have in the past been tunneling tips, optical beam deflection, or optical interferometers. Other sensors such as capacitive and inductive proximity detectors are possible. The principle of these microscopes is to scan the tip over the sample while keeping the force of the tip on the surface constant. This force is kept constant by moving either the sample or tip up and down to keep the deflection of the lever constant. In this way the topography of the sample can be obtained from this vertical motion and this data can be used to construct 3-dimensional images of the topography of the surface. In previous atomic force microscopes, an analog feedback circuit varied the height of the tip or sample using the deflection of the lever as an input.

Measuring the topography of a sample does not indicate the species of object on the surface. For instance, when measuring a biological sample it would be useful to measure the stiffness of the sample to separate, say, salt crystals from DNA or to separate the DNA from a hard surface such as glass that it may be lying on. Topography only measures shape, not stiffness.

Wherefore, it is the object of this invention to provide an atomic force microscope and method of operation which has the ability to map out both the local stiffness and the topography of a sample with nanometer resolution in order to better distinguish features in the data.

Other objects and benefits of the invention will become apparent from the description which follows hereinafter when taken in conjunction with the drawing figures which accompany it.

SUMMARY

The foregoing object has been achieved in an atomic force microscope having a sample holder and a probe with a sensing tip, scanning means for creating relative movement between a sample in the holder and the sensing tip in orthogonal X, Y, and Z coordinate directions, sensing means for sensing the position of the sensing tip, and feedback means connected between the sensing means and the scanning means for creating a scan of the tip over a sample in the holder and for maintaining the tip in a pre-established relationship with respect to a scanned surface of the sample in the Z direction to obtain height information about the scanned surface of the sample, by the improvement of the present invention to also allow material characteristics information to be obtained simultaneously about the scanned surface of the sample wherein the feedback means comprises: analog-to-digital conversion means for obtaining an analog signal from the sensing means and for converting the analog signal into a digital signal; digital computation means including program means for receiving the digital signal from the analog-to-digital conversion means and for calculating and outputting first digital vertical control signals which create desired relative movement between a sample in the holder and the sensing tip in the Z coordinate direction which maintain the tip in the preestablished relationship with respect to the scanned surface of the sample in the Z direction; and, first digital-to-analog conversion means for receiving the first digital vertical control signals from the digital computation means and for outputting analog control signals to the scanning means to affect movement thereof in the Z direction.

In the preferred embodiment, there is second digital-to-analog conversion means for receiving second digital control signals from the digital computation means and for outputting analog control signals to the scanning means to affect movement thereof in the X and Y directions wherein the digital computation means further includes program means for calculating and outputting the second digital control signals which create a raster scan movement between a sample in the holder and the sensing tip in the X and Y coordinate directions. Preferably, the sample holder is attached to the scanning means and the probe is held stationary whereby the sample in the sample holder is moved with respect to the sensing tip to create the relative movement between the two.

Also in the preferred embodiment, the digital computation means includes means for modulating the relative movement between the tip and scanned surface of the sample in the Z direction so as to vary the force on the sample and for calculating the stiffness of the sample as a function of changes in the force and changes in the position of the tip. In one approach modulation by the digital computation means is done during scanning in the X and Y directions to obtain the stiffness of the sample as a function of X and Y. In another, force variation done by the digital computation means is done so as to vary the average force during each scan line so as to obtain the stiffness of the sample as a function of force. The force may be varied so as to obtain stiffness as a function of force at one or more points on the sample.

In another aspect, the digital computation means includes means for determining a tip null point and means for then setting the vertical position of the sample with respect to the tip so that the force between the tip and the sample is a pre-determined value.

The invention may also have the digital computation means include means for varying the vertical position of the sample with respect to the tip so as to obtain a force position curve and means for then setting the force of the tip on the sample near a minimum value as determined from the curve.

In another approach, the digital computation means includes means for detecting that the tip has come off the surface and means to interrupt the feedback process to place the tip quickly back on the surface in order to continue the scan with little loss of data.

In an alternate embodiment, the atomic force microscope of the invention additionally comprises supplemental positioning means for applying a supplemental force to the tip in the Z direction wherein the digital computation means includes means for sending control signals to the supplemental positioning means whereby to set the force of the tip on the sample.

DESCRIPTION OF THE DRAWINGS

FIG. 1 is a functional block diagram of one implementation of an atomic force microscope according to the present invention.

FIGS. 2-4 are simplified drawings depicting one way of operating the atomic force microscope of FIG. 1 according to the method of this invention.

DESCRIPTION OF THE PREFERRED EMBODIMENT

Figure 9:
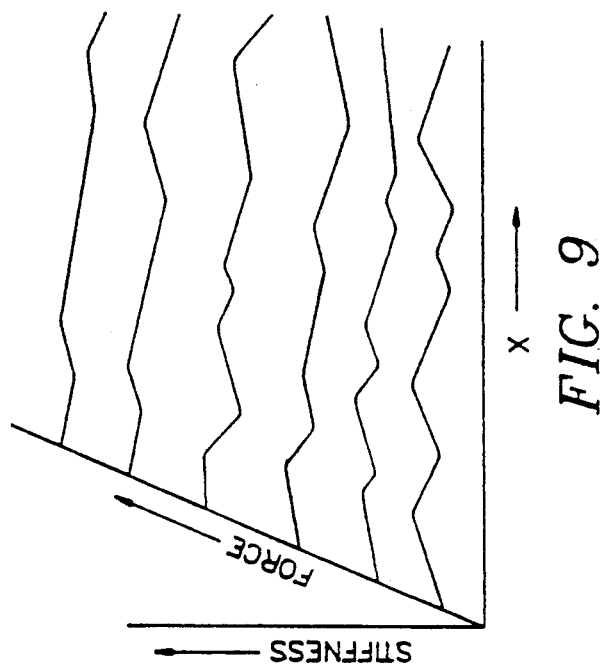
FIG. 9 is a simplified drawing depicting still another way of operating the atomic force microscope of this invention.

The atomic force microscope of this invention and its method of operation which are now to be described in detail, can map out both the local stiffness and the topography of a sample with nanometer resolution in order to better distinguish features in the data. FIG. 1 shows a block diagram of one implementation thereof wherein the atomic force microscope (AFM) is generally indicated as 10.

The feedback loop, generally indicated as 12, of the AFM 10 is unlike prior art feedback loops as applied to atomic force microscopes wherein the feedback only positions the tip of the probe at a constant position with relationship to the surface of the sample—yielding only topographic data. The feedback loop 12 of this invention is controlled by high speed programmable electronics 14 which accepts the sensor signal from the tip sensor 16, which has been converted to digital form by one or more analog-to-digital (A-D) converters 18. This signal at 20 is processed digitally by the high speed programmable electronics 14 and the outputs 22 and 24 thereof control the (X,Y) and Z scanning, respectively, of the sample 26 which, in this embodiment, is carried on the X, Y, Z piezoelectric positioner 28, which is of a type well known to those skilled in the art. The digital outputs from the high speed programmable electronics 14 on outputs 22, 24 are connected to the positioner 28, which is driven by analog voltages applied thereto, through one or more digital-to-analog (D-A) converters 30. Such a positioner 28 could be a piezoelectric tube which deflects when voltages are applied to electrodes on it (not shown) to produce three-dimensional motion of the sample 26. In an alternate arrangement, the sample 26 could be stationary with the sensing tip 32 mounted on the positioner 28 for 3-dimensional movement thereby, or the X-Y motion could be applied to the tip (sample) and the Z motion to the sample (tip). The AFM 10 of this invention (in either embodiment—probe or sample moving) is more complex than the conventional atomic force microscope; but, is able to measure not only topography but also local stiffness as a function of force. It can also set periodically and very sensitively the force between the tip and sample, and calibrate the force between the tip and sample to give absolute values to the stiffness. It can also be operated to minimize loss of data when scans are being made at very low tip-sample forces.

In a pre-production commercial embodiment as built and tested by the inventors herein, the high speed electronics 14 samples the position of the lever 34 carrying the tip 32 at a rate of 25,000 times 3,225,000 times a second. It takes as an input at 20 the lever position and then calculates and outputs at 22 (through scan controller 42) and 24 the signals required to adjust the vertical position of the sample 26 in order to control the force between the tip 32 and the sample 26. Those skilled in the art will readily recognize and appreciate that this is quite unlike conventional force microscopes in which the height of the sample is adjusted by the feedback loop and the height (as represented by the analog Z positional voltage into the positioner) is then read by the associated calculating computer to construct and X, Y, Z topography. In the atomic force microscope of this invention, the height of the sample is calculated by the digital electronics 14 and then output to the piezoelectric scanning positioner 30. In this manner, the control of the height of the sample 26 can be used for more than just keeping the force constant; and, can be used to manipulate this force to obtain much more information about the sample 26 than can be done with a conventional system according to the prior art. The feedback calculation in the AFM 10 of this invention is controlled by a program contained in the program memory 36 and this program can be changed by the operator through the computer 38. The computer 38 also has access to the topography and stiffness data which the high speed electronics 14 places in the data memory 40 during or at the end of a scan.

In the present implementation as built and tested by the inventors herein, the sample 26 is mounted on a conventional piezoelectric tube (being the positioner 28) which is able to move the sample 26 in three dimensions by the application of appropriate control voltages thereto. The high speed digital electronics 14 consists of a digital signal processor having the program memory 36 and data memory 40 connected thereto. The digital signal processor within the high speed digital electronics 14 also controls the X-Y scanning (through the scan controller 42) so that nonlinear scan waveforms can be used for the scanning in order to compensate for nonlinearities in the piezoelectric device. These nonlinear waveforms are calculated by the signal processor from formulas which the inventors have found to describe the nonlinearities in the scanner. This method is described in our co-pending application Ser. No. 344,750, filed 28 Apr. 1989 by Virgil Elings and John Gurley entitled METHOD OF DRIVING A PIEZOELECTRIC SCANNER LINEARLY WITH TIME, also assigned to the common assignee of this invention, the teachings of which are incorporated herein by reference. This application was abandoned when a file wrapper continuation thereof, Ser. No. 07/622,353, was filed on Nov. 29, 1990, which is now U.S. Pat. No. 5,051,646.

In the preferred implementation of the AFM 10, a stiffness map (stiffness as a function of the XY position) of the sample 26 is obtained by modulating the force between the tip 32 and sample 26 during a scan by having the digital electronics 14 modulate the vertical position of the sample 26 while also keeping the average force between the tip 32 and sample 26 constant. The bending of the lever 34, which is a measure of the force on the tip 32, is measured by an optical detector (being the tip sensor 16) which senses the deflection of a light beam which is reflected from the back of the lever. This approach to tip sensing in an atomic force microscope is, of course, known to those skilled in the art and, per se, forms no point of novelty of this invention. Such a detector may consist of several parts or sections, each one of which may be connected to an A-D convertor or some analog mixing of the signals (such as subtraction) may occur before the signal is digitized.

To measure the topography of the sample 26, the digital electronics 14 take in the deflection of the light beam, which is a measure of the vertical position of the tip 32, and regulate the height of the sample 26 so that the position of the tip 32, and hence the force of the tip 32 on the sample 26, stays constant as depicted in FIGS. 2–4. Under this condition, the sample 26 is moved up and down by an amount which is equal to the topography of the surface and hence this motion, which is calculated and sent to the vertical position Z, is a measure (inverted) of the topography of the sample 26 and is stored into data memory 40. This feedback can be made to depend on any function of the input signal as determined by the program in program memory 36. The inventors herein normally use proportional-integral feedback; but, have also used a very nonlinear feedback gain which insures that the tip 32 will not be damaged on the surface of the sample 26.

Figure 5:
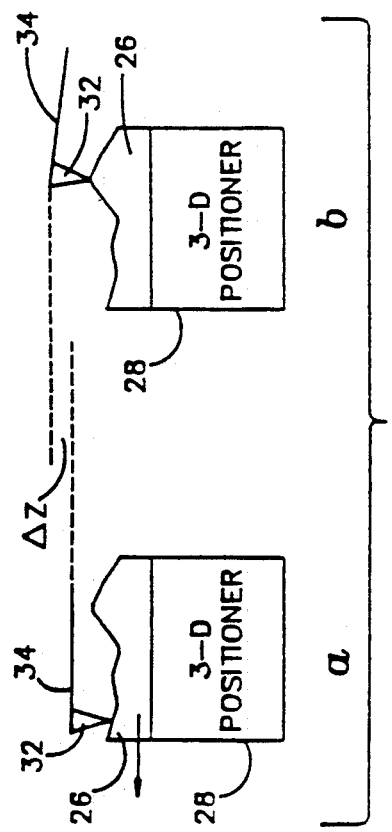
FIGS. 5 and 6 are simplified drawings depicting alternate ways of operating the atomic force microscope of FIG. 1 according to the method of this invention.

Another way of operating the microscope is to not move the sample in the vertical direction with feedback; but, to measure the topography from the deflection of the lever. This method of operation is shown in FIGS. 5a and 5b where the sample is scanned under the tip at constant height and the deflection $\Delta Z$ of the lever is used as a measure of the topography. The disadvantage of this mode of operation is that the force of the tip on the sample varies as the lever deflects and this may affect the topography or result in unnecessarily large forces.

Figure 6:
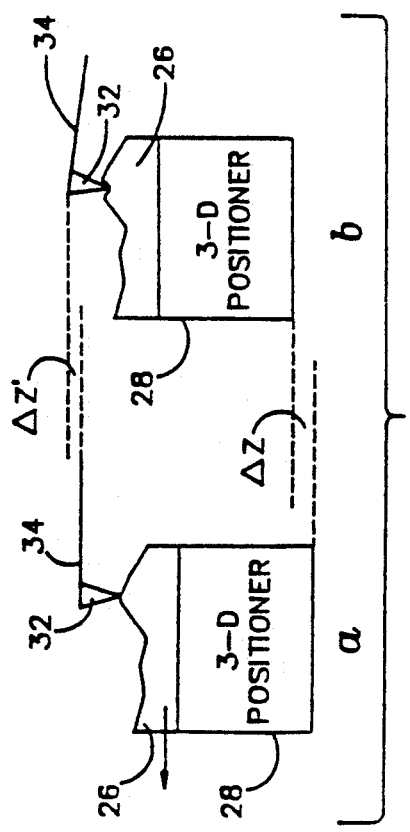

The digital electronics can also be used to modulate the vertical position of the sample 26 as shown in FIGS. 6a and 6b. This modulation is typically rapid compared to the scanning rate across the sample 26. As the sample 26 is modulated up and down by an amount $\Delta Z$, the lever 34 will deflect by some amount $\Delta Z'$. For an infinitely stiff sample 26, the lever 34 will deflect by the same amount the sample 26 is moved, i.e. $\Delta Z' = \Delta Z$. For a sample 26 with finite stiffness, the sample 26 will deform somewhat and $\Delta Z'$ will be less than $\Delta Z$. If the spring constant of the lever 34 ($\Delta F/\Delta Z'$) is equal to K', the modulation in force is $\Delta F = K'\Delta Z'$. The deformation of the sample 26 is $\Delta = \Delta Z - \Delta Z'$, so the spring constant of the sample 26 is:

$$K = \Delta F/\Delta = K'\Delta Z'/(\Delta Z - \Delta Z') = K'/(\Delta Z/\Delta Z' - 1)$$

This quantity can be determined at every data point along the scan so that both topography and stiffness can be determined as a function of X and Y, the horizontal coordinates along the sample 26. Of course, one could image inverse stiffness or simply use $\Delta Z'$ or $\Delta$ as an indicator of stiffness. The term "stiffness" is used herein to mean any parameter which is a measure of how the sample deforms with increasing force.

It should be noted that one can program the digital electronics 14 to modulate the vertical position more than once at each topographical data point in order to obtain an average so as to reduce random noise in the signal. It should be noted as well that although the vertical position of the lever 34 is being modulated, this need not confuse the feedback calculation since the feedback can operate from the average vertical position of the lever 34; or, alternately, from the high or low point of the modulation. In a conventional prior art AFM system with analog feedback, any attempt to modulate the sample 26 is canceled by the feedback loop which is trying to keep the lever 34 at a constant height; so, one must modulate at a frequency beyond the response of the feedback loop, which gives one little choice in operating parameters. Such prior art AFMs do not have the flexibility of the AFM 10 of this invention.

The inventors herein have already used this improved AFM and force spectroscopy to locate atoms on the surface of a mica sample and to study DNA laying on a glass surface. The method of modulating the force and then imaging the stiffness of the sample has the advantage that a surface such as glass, which has a rough topographic image, will have a flat stiffness image and therefore soft molecules on it such as DNA can be easily image and studied.

Figure 7:
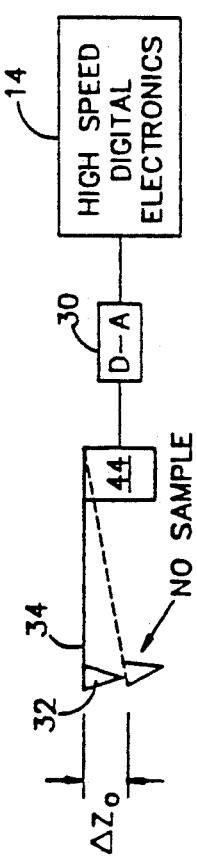
FIGS. 7 and 8 are simplified drawings depicting yet another way of operating the atomic force microscope of FIG. 1 according to the method of this invention when modified by the addition of a supplemental piezoelectric positioner.
Figure 8:
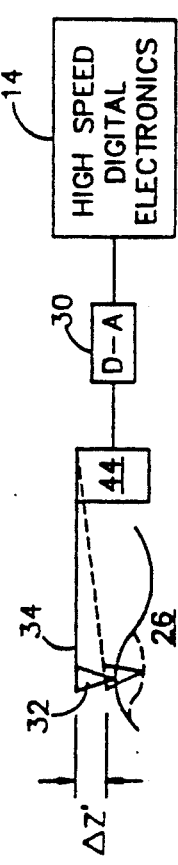

In an alternate configuration, as shown in FIGS. 7 and 8, a separate piezoelectric driver 44 is connected to the lever 34 through a D-A converter 30 from the high speed electronics 14 as a source of independent and controlled force modulation to the tip 32; but now, in a way that for a stiff sample 26 there is no motion of the lever 34. For example, let us say that for the tip 32 not on a sample 26 as depicted in FIG. 7, this piezoelectric driver 44 moves the lever 34 up and down by an amount $\Delta Z_0$. For a lever 34 spring constant of K', the force applied by the tip 32 on a stiff sample 26 would be $\Delta F = K'\Delta Z_0$. On an elastic sample 26, this force would cause the tip 32 to deform the sample 26 by $\Delta Z'$, as shown in FIG. 8. The force now would be $K'(\Delta Z_0 - \Delta Z')$ and the stiffness of the sample 26 would be:

$$K = \Delta F/\Delta Z' = K'(\Delta Z_0 - \Delta Z')/\Delta Z'$$

$$K = K'((\Delta Z_0/\Delta Z') - 1)$$

This would be more accurate on stiff samples where $K > K'$ whereas the previous implementation would be more accurate for soft samples where $K < K'$.

The average force of the tip 32 on the sample 26 can be varied during a scan or from scan line to scan line so that this stiffness could be mapped at different force levels. One could use the AFM 10 of this invention to see whether this stiffness is linear or nonlinear in order to determine more about the sample 26. One method of operating would be to scan only in the X direction, i.e. over the same line with no Y motion, and increase the average force during each line scan by progressively increasing the deflection of the lever 34 by incrementing the tip 32 position at which the feedback holds constant. This would give a map of stiffness versus force on the sample 26 for one scan across the sample 26. This mode of operation is depicted in FIG. 9.

Figure 10:
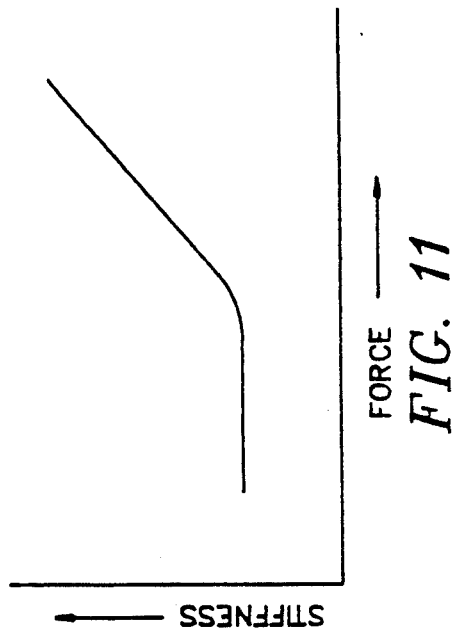
FIG. 10 and 11 are simplified drawings depicting an alternate way of operating the atomic force microscope of this invention.
Figure 11:
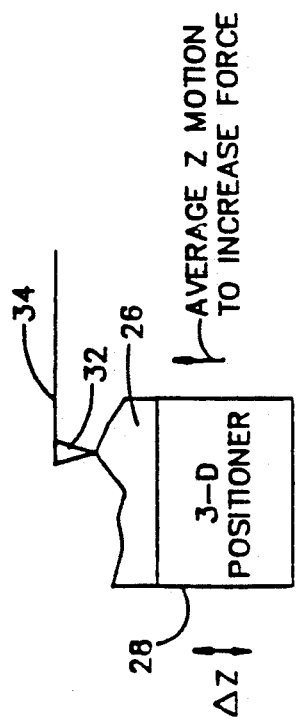

Another mode of operation is at each point or at selected points to measure a stiffness versus force curve for the sample 26. This would be done by having the digital electronics 14 modulate the vertical position of the sample 26 while the sample 26 is, on the average, being moved upward (downward) to increase (decrease) the force of the tip 32 on the sample 26. This mode of operation is depicted in FIGS. 10 and 11.

Figure 12:
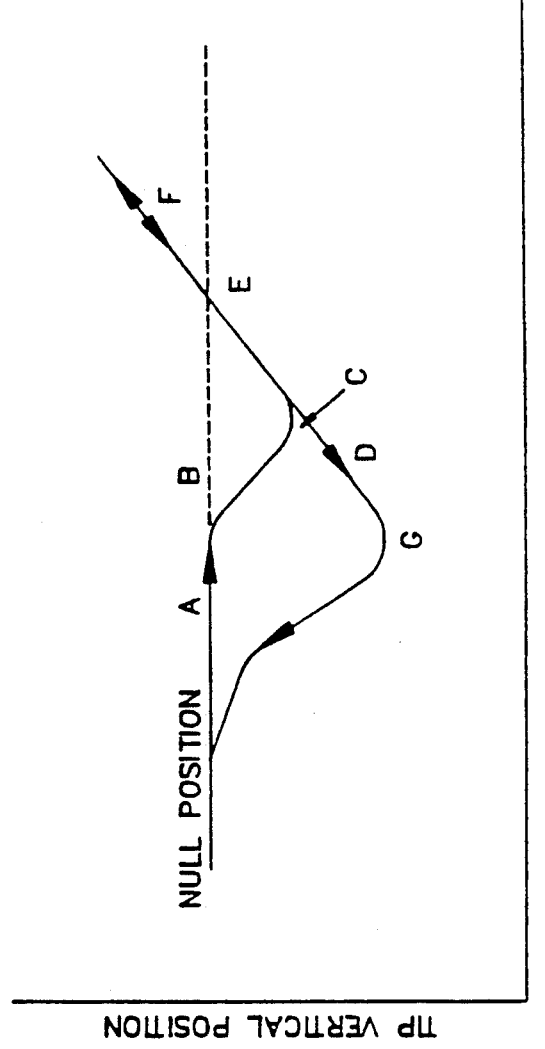
FIG. 12 is a graph of tip vertical position versus sample vertical position when operating the atomic force microscope of this invention according to one of the possible variations of the method thereof.

The digital electronics 14 controlling the vertical position of the sample 26 is used to calibrate and set the force with which the tip 32 presses on the surface of the sample 26. FIG. 12 shows a typical tip displacement versus sample displacement curve as the sample 26 is raised toward the tip 32. Initially, with the tip 32 not in contact with the sample 26, the force between the tip 32 and sample 26 is zero at point A and then becomes attractive Van der Waals force. At Point C, this attractive force overcomes the spring tension of the lever 34 and the tip 32 then drops to the surface of the sample 26 until the contact provides a repulsive force between the tip 32 and sample 26. As the sample 26 is raised further, the tip 32 now follows the sample 26 upward with the tip 32 remaining in contact with the sample 26 along the path portion D, E and F. The slope of this path will depend somewhat on the stiffness of the sample 26.

When the sample 26 is retracted, the tip 32 follows the sample 26 beyond the point where the tip 32 touched the sample 26 during the upward motion if there is moisture on the surface which holds the tip 32 on the surface by surface tension. At point G, the tip 32 breaks free from the surface. As seen in the figure, the total tip 32 force can be positive as in region F, zero, as at E, or negative as at B and D.

For very sensitive samples, it is necessary to operate sometimes with the lowest possible repulsive force on the tip 32, just at the point where the tip 32 wants to break loose from the sample 26. This would be the setpoint force about which the feedback calculations would operate to hold the force constant. Because of drifts in the sensor 16 and creep in the piezoelectric scanning positioner 28, this setpoint tends to drift during operation so it is important that the control system can activate the setpoint procedure at various times, say at the end of a complete scan frame or even at the end of each scan line. This is important for biological samples where very small forces are required. This was pointed out by Weisenhorn et al in "Applied Physics Letters", 54(26) 26 Jun. 1989, p 2651. In their apparatus, however, they would need to interrupt the data-taking to remove the feedback loop and perform the force calibration (for reasons associated with prior art analog feedback as discussed earlier herein). By contrast, in order to find the operating point, the digital electronics 14 of the AFM 10 of this invention, under program control, can vary the height of the sample 26 to determine this curve, from the tip sensor input, and set the force between the tip 32 and sample 26.

Since the spring constant K' of the lever 34 is known from its geometry, measuring the deflection of the lever 34, $\Delta Z$, from its null point A gives the force between the tip 32 and sample 26 by the formula $F = K'\Delta Z$. The calibration procedure can quickly find the null point and check the force displacement curve to assure that the instrument is operating well.

When operating with very low forces between the tip and sample, prior art devices have had the problem that the tip will leave the surface, causing the entire image to be lost, since the prior art feedback will not bring the tip back down on the surface. The problem is the following: The force applied to a sample is comprised of long-range Van der Waals force, which attracts the sample to the tip, and a short range coulomb force which is repulsive. The short rang coulomb force at the tip is concentrated over a very small area and can adversely affect soft samples by causing them to rupture. It is therefore desirable to minimize the coulombic force at the tip for imaging soft samples. When the feedback set point is adjusted to minimize the repulsive coulomb force, the net force on the cantilever is attractive, displacing it downward, such as point D in FIG. 12. While running in the attractive mode, the prior art feedback loops were unstable. Any bump on the surface or noise would cause the tip to leave the surface. Since the net deflection is negative, the tip springs to the null point at a location above the set point. Thus, conventional feedback interprets this as a rise in the surface and moves the sample down, which continues pulling the tip and sample apart, i.e. the feedback is now in the wrong direction. The tip will not go back to the surface until this feedback is interrupted and the tip reset.

In prior art systems, the lowest tip force that could be used was set by the lowest force possible to complete an entire scan without the tip leaving the surface. On rough surfaces, this minimum force was limited by the above-described effect and could be larger than desired.

The improved atomic force microscope of this invention can produce images at lower tip force by being able to bring the tip back down to the surface whenever it comes off and continue imaging with little data being lost. The digital computation logic can be programmed to detect that the tip has most likely come off the surface and then respond by going into a mode which brings the tip back to the surface. It is best that the scanning in the horizontal direction continue during this process, since the hysteresis in the scanner can be controlled better if each scan line is scanned in the same way.

Figure 13:
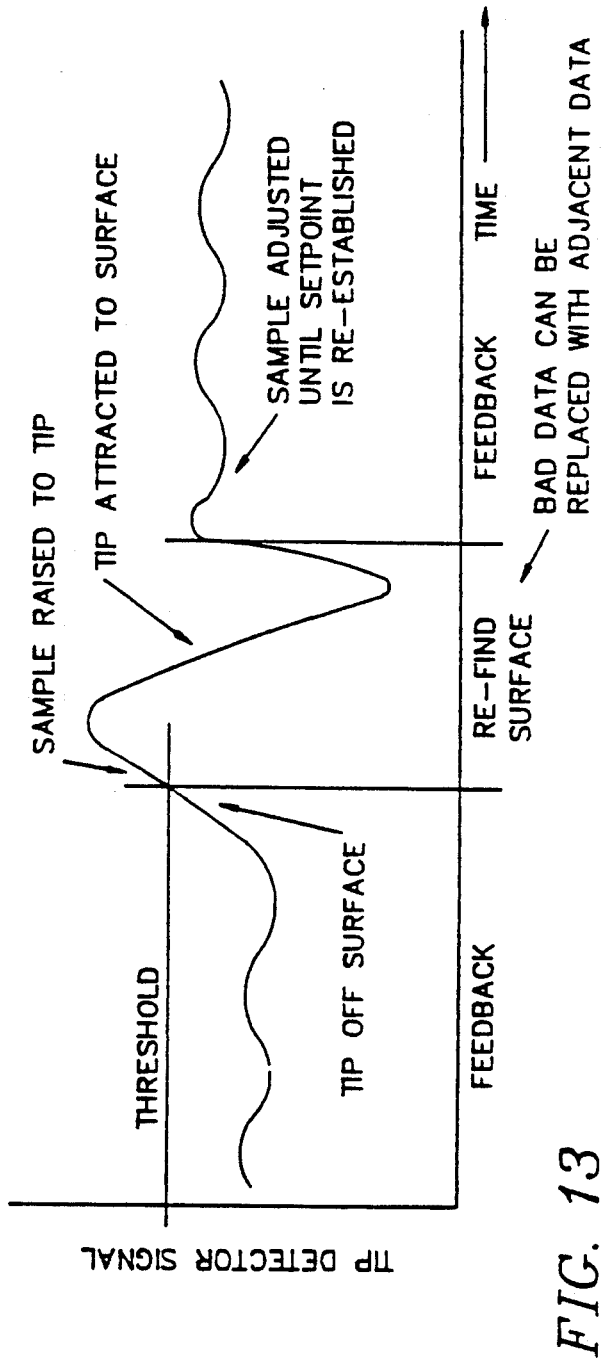
FIG. 13 is a drawing of a way to operate the atomic force microscope of this invention to minimize loss of data.

FIG. 13 shows a method according to the present invention for determining if the tip 32 has most likely come off the surface. As the sample 26 is normally scanned along, the height of the tip 32 is detected. When the tip 32 goes up, the sample 26 is moved down to keep the tip 32 at a constant height (the tip 32 will follow the sample 26). If a large positive motion of the tip 32 is detected (larger than some threshold value), then the program will, instead of lowering the sample 26, raise the sample 26, assuming that the tip 32 has come off the sample 26. The program would then check the tip 32 height. If it does not change, then the tip 32 is indeed off the surface and the sample 26 will then be raised to contact the tip 32. This could be done in a series of steps of moving and checking, or could be done quickly, since the processor could know the shape of the curve in FIG. 12 and could bring the sample 26 up a certain amount and then lower it to get the operating point D. The topography would be essentially known from the previous scan line, so that program could use that information to help in bringing the sample 26 to the tip 32 and keep the forces low.

So, as can be seen from the foregoing description, this improved atomic force microscope is able to operate in a mode where the event of the tip 32 leaving the surface is quickly corrected. As a further improvement, the instrument either in the high speed electronics or computer can replace the bad data taken when the tip 32 is off the surface with data taken on the previous scan line or the next scan line (or some average) to produce an image with little distortion due to lost data.

In summary, what has been disclosed hereinbefore is an improved atomic force microscope which uses programmable high speed digital circuitry in the feedback control so that the device can be operated in several modes to improve the performance of the microscope.

Wherefore, having thus described our invention, what is claimed is:

1. An atomic force microscope comprising:
   a probe;
   scanning means for creating relative movement between a sample and the probe in x, y and z coordinate directions;
   sensing means for sensing the position of the probe; and
   control means for controlling positioning of the probe with respect to a scanned surface of the sample in the z direction, said control means comprising,
   analog-to-digital conversion means for obtaining an analog signal from the sensing means and for converting said analog signal into a digital signal;
   digital computation means, operable under program control and including a memory for storing a control program, for receiving said digital signal from said analog-to-digital conversion means and for calculating and outputting digital vertical control signals to control the vertical position of one of the probe and the sample in the z direction, wherein the control program stored in said program memory includes first program means for controlling said scanning means to vary the vertical position of said one of the probe and the sample so that the force between the probe and the sample is not maintained constant and data is obtained while the force between the probe and the sample is not maintained constant; and
   digital-to-analog conversion means for receiving said digital vertical control signal from said digital computation means and for outputting analog control signals to the scanning means to affect movement of said one of said probe and said sample in the z direction.

2. The atomic force microscope of claim 1, wherein said digital computation means comprises:
   means for controlling scanning by said scanning means in the x and y coordinate directions, including,
   second program means for calculating and outputting digital scan control signals which create a raster scan movement between the sample and the probe in the x and y coordinate directions, and
   further digital-to-analog conversion means for receiving the digital scan control signals from the scan control means and outputting analog control signals to the scanning means to affect scanning movement in the x and y coordinate directions.

3. The atomic force microscope according to claim 1, wherein:
   the sample is coupled to the scanning means and the probe is held stationary whereby said sample is moved with respect to the probe.

4. The atomic force microscope according to claim 1, wherein said first program means of said digital computation means comprises:
   means for controlling said scanning means to vary the vertical position of one of the sample and the probe so as to obtain a force position curve as a function of sample position and probe deflection.

5. The atomic force microscope according to claim 4, wherein the control program stored in said memory controls the digital computation means to perform the steps of:
   bringing the probe and the sample into contact;
   varying the vertical position of one of the probe and the sample until an attractive force of the probe to the sample is overcome by an external force applied to the probe and the probe therefore breaks free of the sample; and
   determining a tip null point as a vertical position of the one of the probe and the sample whose position was varied at the time the probe breaks free of the sample.

6. The atomic force microscope of claim 5, wherein said digital computation means further comprises:
   means for setting the force between the probe and the sample after determining said tip null point so that the force between the probe and the sample is a predetermined value.

7. The atomic force microscope according to claim 1, wherein first program means of said digital computation means comprises:
   means for controlling said scanning means to vary the vertical position of one of the sample and the probe so as to obtain a force position curve at an end of a scan line.

8. The atomic force microscope according to claim 1, wherein said first program means of said computation means comprises:
   means for first determining a force-position curve and for then setting the force of the probe on the sample near a minimum value as determined from said curve.

9. The atomic force microscope according to claim 1, further comprising:
   supplemental positioning means for applying a supplemental force to the tip in the z direction; and
   said digital computation means including means for sending control signals to said supplemental positioning means thereby to set the force of the probe on the sample.

10. The atomic force microscope according to claim 1, wherein said digital computation means comprises:
   means for determining that the probe has separated from the surface of the sample; and
   means for generating control signals to place the probe back in contact with the sample.

11. The atomic force microscope according to claim 10, wherein said digital computation means comprises:
   means for replacing bad data taken when the probe is separated from the surface of the sample with data from an adjacent scan line derived when the probe was in contact with the surface of the sample.

* * * * *

UNITED STATES PATENT AND TRADEMARK OFFICE
CERTIFICATE OF CORRECTION

PATENT NO. : 5,224,376
DATED : July 6, 1993
INVENTOR(S) : Virgil B. Elings et al.

It is certified that error appears in the above-indentified patent and that said Letters Patent is hereby corrected as shown below:

On the title page, Item [75],

The third inventor, Peter Maivald of Goleta, Calif., should be deleted from the inventorship.

Signed and Sealed this

First Day of March, 1994

BRUCE LEHMAN

*Attest:*

*Attesting Officer*  *Commissioner of Patents and Trademarks*